July 21, 1970   W. E. JOOR II   3,521,416
SUSPENSION ROOF

Original Filed Feb. 8, 1967

INVENTOR.
WILLIAM E. JOOR II
BY Bertram A. Mann
ATTORNEY

July 21, 1970   W. E. JOOR II   3,521,416
SUSPENSION ROOF

Original Filed Feb. 8, 1967   6 Sheets-Sheet 2

*INVENTOR.*
*WILLIAM E. JOOR II*
BY
ATTORNEY

INVENTOR.
WILLIAM E. JOOR II
BY Bertram H. Mann
ATTORNEY

INVENTOR
WILLIAM E. JOOR II
BY Bertram...
ATTORNEY

United States Patent Office 3,521,416
Patented July 21, 1970

1

3,521,416
SUSPENSION ROOF
William E. Joor II, Houston, Tex., assignor to U.S. Industries, Inc., Houston, Tex., a corporation of Delaware
Original application Feb. 8, 1967, Ser. No. 614,722, now Patent No. 3,449,884, dated June 17, 1969. Divided and this application June 24, 1968, Ser. No. 739,356
Int. Cl. E04b *1/00*
U.S. Cl. 52—222                    1 Claim

ABSTRACT OF THE DISCLOSURE

A roof for large, cylindrical tanks is assembled on sagging tension bars suspended between an erect center column and the accurately-shaped compression girder at the top of the tank shell. The tension bars, preferably, are removed after the roof sheeting is applied and are designed so that the finished roof, preferably, will slope downwardly at all points toward its outer periphery, for discharging fluent material, irrespective of anticipated live and dead loading of the roof sheet or membrane.

RELATED APPLICATION

This application is a division of my application Ser. No. 614,722, now Pat. No. 3,449,884, filed Feb. 8, 1967.

BACKGROUND OF THE INVENTION

Field of the invention

This invention relates to storage tanks and, particularly, fixed roof constructions therefor.

Description of the prior art

Since such tanks usually are cylindrical and may be 100 to 200 feet or more in diameter, the design and construction of fixed roofs therefor, particularly with minimum obstruction of the tank interior, involves substantial difficulties. Heretofore, in some instances, such roofs have been supported upon additional interior columns and/or massive girder or trusswork constructions, which, of course, limit the tank capacity and hinder or prevent the provision of an interior floating roof. In other instances, suspension roofs have been provided with intermediate gutters therein which complicate the roof and have the effect of undesirably increasing the axial and radial loading of the peripheral compression ring and tank wall.

SUMMARY OF THE INVENTION

Consequently, an object of the present invention is to provide a novel fixed roof construction for large fluid tanks, particularly cylindrical tanks, which requires for support only a single center column in addition to the ring girder at the upper edge of the outer shell.

Another object is to provide a fixed roof construction for large, cylindrical liquid tanks, particularly of a suspension type, in which water and other fluent materials cannot be trapped on the roof even when deflected by large live loads.

Another object is to provide a suspension roof for large cylindrical tanks in which the transmission of vertical forces to the compression ring girder and tank wall is minimized.

2

In accordance with the present invention, the novel suspension roof is erected by suspending flexible tension bars between a center column and the accurately trued ring girder at the upper edge of the tank shell. Roof sheets or plates are laid on the tension bars and properly secured together and to the ring girder. The curve of the roof is calculated, with due regard for the weights and strengths of the roof sheeting and anticipated loading, so that the roof will slope at all times and at all points downwardly and outwardly toward its outer periphery and fluent materials will be readily and quickly shed from the roof. The design of the curve-determining tension bars is achieved with the aid of computer techniques.

BRIEF DESCRIPTION OF THE DRAWINGS

In the accompanying drawings which illustrate the invention.

DESCRIPTION OF THE PREFERRED EMBODIMENTS

Figure 1:
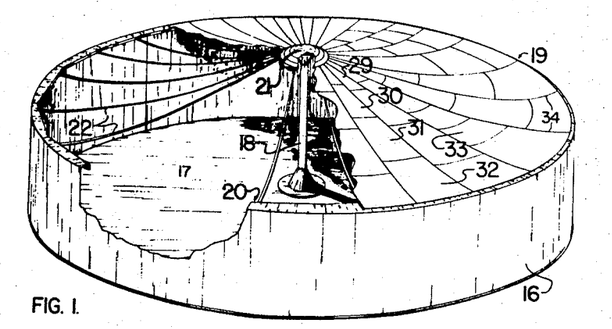
FIG. 1 is a perspective view of a liquid tank during construction of the new roof, portions being broken away to illustrate the tension rods used in erecting the roof.

FIG. 1 illustrates a large tank of the type used in storing petroleum or other volatile liquids and having a cylindrical side wall or shell 16, a flat floor 17, a center column 18, and a suspension-type roof, generally designated 19. Extending around the upper edge of shell 16 and inwardly thereof is a compression ring girder 20, and a roof crown plate 21 is mounted on top of center column 18. Roof 19, made up of a series of plates forming a sheet or membrane, as will be described, bridges the space between crown plate 21 and ring girder 20. Flexible tension rods, bars, or cables 22 extend radially between plate 21 and the ring girder for use in erecting the roof.

Figure 2:
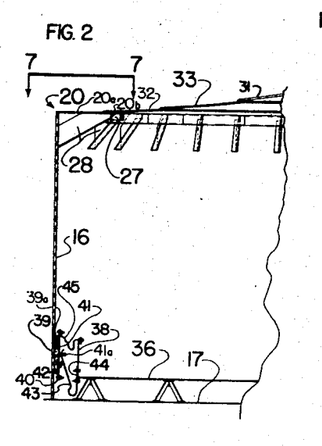
FIG. 2 is an enlarged partial radial section illustrating the outer parts of the completed roof structure of FIG. 1.
Figure 2A:
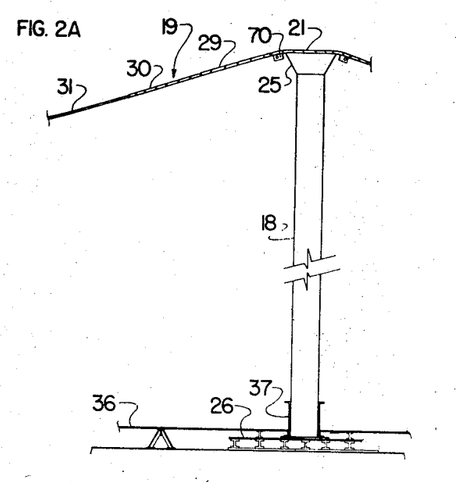
FIG. 2A is a similar view showing the inner parts of the roof construction.
Figure 7:
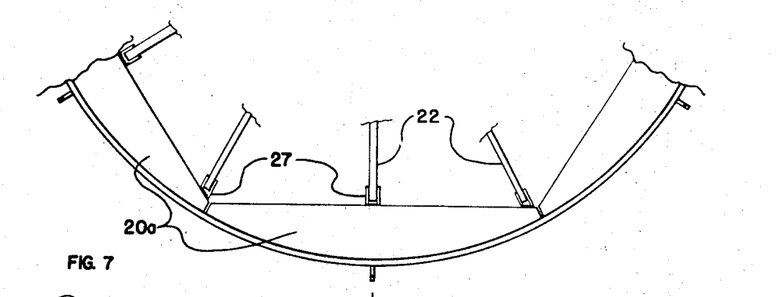
FIG. 7 is an enlarged detail plan viewed from the line 7—7 of FIG. 2 and showing the shape of the compression ring structure, the overlying roof being removed.

FIG. 2A shows the inner portion of the completed roof with erection rods 22 removed. Crown plate 21 is shown as connected to center column 18 by means of an inverted, load-dispersing cone 25 and the center column rests upon floor reinforcement platform 26. Compression girder 20, as best shown in FIGS. 2 and 7, is formed of segmental plates 20a preferably welded to the upper edge of tank shell 16 and provided with inner flanges 20b from which project inwardly extending attachment clevices 27, for a purpose to be described. Plates 20a are braced by gussets 28. The roof sheeting or membrane itself (FIG. 1) is made of frusto-conical or gore-shaped plate sections, as at 29, 30, 31, 32, and 33, of staggered heights and placements and assembled radially, as represented by the radial lines 34 in FIG. 1. Since the radial stresses in the roof membrane are greatest adjacent the center post and decrease outwardly, the roof plates may be reduced in thickness outwardly, as suggested in FIG. 2A, wherein crown plate 21 is thicker than gore plates 29, which are thicker than plates 30, and so on. All plates may be welded together at their abutting edges. Plates 21, 29, 30, and 31 are shown as butt-welded to their adjacent plates, while the outer tiers of plates 32 and 33 slightly overlap their adjacent plates and are lap welded thereto. The outermost roof plates are lap welded to the upper surface of compression girder plates 20a.

A floating roof 36 of the pan type is received within the tank (FIGS. 2 and 2A) and is provided with a central sleeve 37 (FIG. 2A) which slidably receives and seals about center column 18. At the outer edge of the floating roof 36 (FIG. 2) there is provided a vertical flange 38 which mounts wall seal structure. This structure consists of a shoe forming pad 39, preferably of foam rubber or foam synthetic plastic material such as polyurethane encased in a scuff band and cover 39a, for instance, of nylon cloth reinforced polyurethane. The seal pad or pads extend entirely around and sealingly engage the inner surface of tank shell 16. A back-up sheet 41 is secured to the face of the pad and is connected, as by studs 41a, to generally U-shaped spring straps each having legs as 43 and 44, the latter being bolted to peripheral roof flange 38 previously mentioned. Seal fabric 45 is secured to the upper edges of pad 39 or backing sheet 41 and peripheral flange 38 and traverses the space therebetween. As is customary with this type of floating roof, the deck 36 floats on the surface of the liquid in the tank and is carried vertically with pad 39 sealingly rubbing against the inner face of the tank shell as the quantity of liquid stored in the tank is varied. The purpose of the floating roof or deck plate is to prevent or reduce the vaporization of liquids within the tank while protecting the stored liquids from contamination. Where the floating deck is provided beneath a fixed roof, as in this instance, it may be built for supporting reduced live and dead loads and, accordingly, much less expensively.

Figures 3, 4, 5, 6:
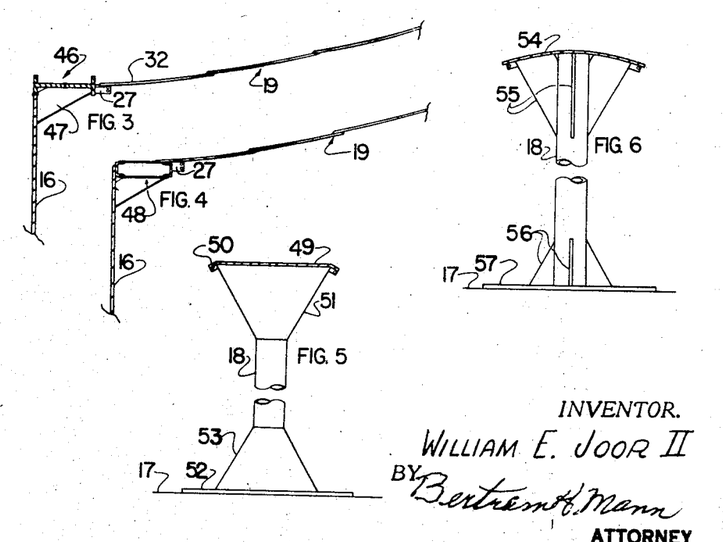
FIGS. 3 and 4 are detail radial sections illustrating different forms of compression ring girders for use with the novel roof construction.
FIGS. 5 and 6 are elevations illustrating different forms of vertical center columns and crown plates for the novel roof.

FIG. 3 shows a modified form of compression ring 46 formed substantially of a built-up I-beam welded as indicated and provided with reinforcing gussets as at 47. FIG. 4 shows still another form of compression ring in the form of a built-up box girder 48.

FIGS. 5 and 6 show slightly modified center column details. In FIG. 5, the crown plate 49 is flat for a greater extent than is plate 21 in FIG. 2A and has a relatively small, inclined flange 50 for welding to the abutting roof sheet plates. A relatively large, inverted cone 51 transmits vertical forces from the crown plate to center column 18. The center column and bottom plate 52 are reinforced at the bottom by a frusto cone 53. In FIG. 6, crown plate 54 is of generally curved cross section and is supported from center column 18 by means of corner braces 55. At the bottom, vertical forces are transmitted from column 18 to the tank floor 17 by means of gussets 56 and base plate 57.

Figure 8:
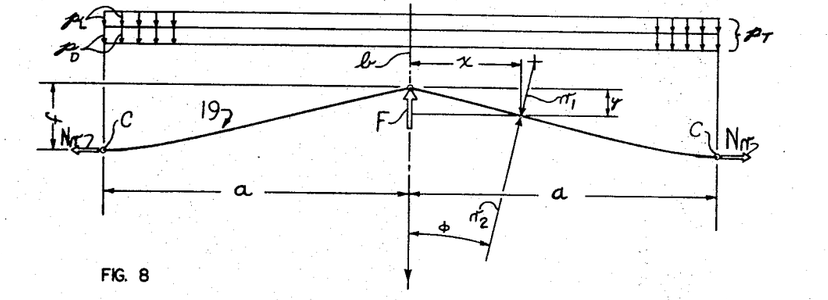
FIGS. 8, 8a, 8b, 8c, 8d, 8e, and 8f are diagrams illustrating the geometry of the new roof and its mathematical development as utilized in designing the same to bear the dead and live loads expected.

FIG. 8 is a geometrical and force diagram of the suspension roof, in which the roof membrane structure 19 is depicted as having assumed the sagging shape of erection rods 22 (FIG. 1). Due to the shape of the roof, the horizontal component of the tension in the roof membrane varies at different radial distances from the center column and, therefore, the cross-sectional curve of the roof membrane is not a true catenary.

Since the essence of this invention is a roof design for a vertical cylindrical storage tank (1) which will drain all rain water over the eaves as it falls on the roof, (2) which will be of a membrane-type construction, (3) which will permit elimination of the vast tonnage of structural steel in the form of rafters, beams, girders, and columns (except one center column) required in previous fixed roof constructions, and (4) which will be economical and easy to build, the invention may be better understood from an analysis of the engineering, mathematical, and construction techniques involved.

Within my experience this is the first design of a vertical cylindrical storage tank structure which requires the use of the sophisticated disciplines of mechanical engineering using the "Theory of Elasticity" and the "Membrane Theory," mathematical dexterity using differential equations to establish the curvature, i.e., the shape, of the vertical cross section of the membrane steel roof plates, numerical integration or approximate integration employing the trapezoidal rule or the Simpson rule or other approximations to determine the deflection of the membrane steel roof plates, the logic required to convert the engineering and mathematical problems into an electronic computer program acceptable by a powerful computer, and the engineering knowledge of an experienced tank builder.

In order that those skilled in the art may better understand the invention, the design principles are here mathematically developed. FIG. 8 diagrams a vertical cross section of the roof which is a surface of revolution about its vertical axis $b$, with anticipated live loads and dead loads represented as uniform loads symbolized by the arrows $p_L$ and $p_D$, respectively, over the entire plan area of the roof and $p_T$, the total load. Then $$p_T = p_D + p_L$$

It is assumed, with good engineering judgment, that the height of the roof $f$ is so shallow that the dead weight of the roof may be taken as uniformly distributed on the horizontal projection. Then considering any point $(x, y)$ on the roof curve, let $\phi$ = the angle formed between the normal ($r_1$) to the roof tangent, through the point under consideration and the vertical axis $b$
$r_1$ = the radius of the roof curvature
$n$ = the number of erection cables or rods used in the construction of the roof
$H$ = the horizontal component in pounds of the stress in one erection cable under the dead load only of the membrane roof plates
$N_r$ = the radial membrane force at point $(x,y)$
$N_\theta$ = the circumferential membrane force at point $(x,y)$
$\sigma_r$ = radial membrane stress at point $(x,y)$
$\sigma_\theta$ = circumferential membrane stress at point $(x,y)$
$h$ = assumed uniform thickness of roof membrane
$a$ = radius of the roof membrane Then by the nature of the erection method of the roof and its basic geometry, the differential equation of the roof cross section becomes $$\frac{dy}{dx} = \frac{\pi p_D}{nH}(a^2 - x^2) \quad (1)$$

The solution of this equation gives the cross section of the roof as follows:

$$y = \frac{3}{2} f \left[ \frac{x}{a} - \frac{1}{3}\left(\frac{x}{a}\right)^3 \right] \quad (2)$$

The membrane solution for the roof stresses yields the following equations:

$$\tan \phi = \frac{3f}{2a}\left[1-\left(\frac{x}{a}\right)^2\right] \quad (3)$$

$$\sigma_r = \frac{Nr}{h} = \frac{p_T(a^2-x^2)}{2xh \sin \phi} \quad (4)$$

$$\sigma_\theta = \frac{N_\theta}{h} = 0 \quad (5)$$

To find $\sigma_r$ first find $\phi$ from Equation 3, then find $\sigma_r$ from Equation 4. It is noted that for this particular roof configuration, $\sigma_\theta$ has a value of zero everywhere in the membrane.

The compression ring girder, which restrains the horizontal force in the membrane roof plates around its perimeter, must be designed to resist circumferential compressive force P in the girder, which may be calculated as follows:

$$P = \frac{p_T a^3}{3f} \quad (6)$$

In order for the compression ring girder to resist buckling in its own plane, the cross section of the girder must have a moment of inertia I about its vertical neutral axis equal to or greater than $I_{(min)}$. It is customary, in good engineering practice in the design of such a structure, to use a safety factor of 2 or more. Therefore, the design value of $I_{(min)}$ may be determined as:

$$I_{(min.)} = \frac{2p_T a^5}{9Ef} \quad (7)$$

where E=the modulus of elasticity of the material of the compression ring.

The central column which supports the entire live and dead load of the roof may be designed using the conventional engineering formulas for column design for an axial compressive load, symbolized by the arrow F, where $$F = \pi p_T a^2 \quad (8)$$

Figure 8A:
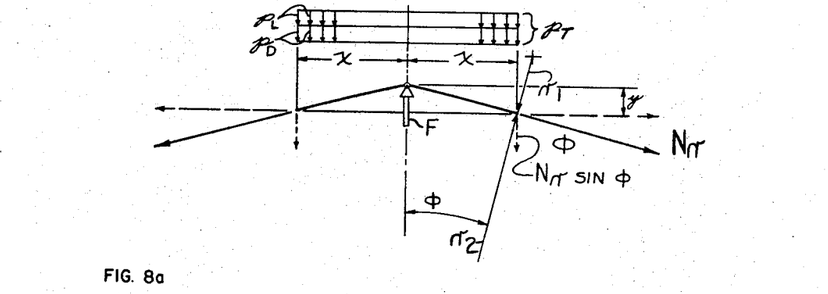

Now consider FIG. 8a showing a free-body diagram of a portion of the roof:

Again, let F=the load (dead load plus live load) on the center column supporting the roof
If $N_r$=the radial force in the roof membrane at any point $(x,y)$ under consideration
Then $N_r \sin\phi$=the vertical component of the force $N_r$
And $N_r \cos\phi$=the horizontal component of the force $N_r$ Now for static equilibrium of the vertical forces in FIG. 8a:

$$F = p_T \pi x^2 + N_r \sin\phi \cdot 2\pi x$$

For equilibrium of the vertical forces in the entire roof:

$$F = p_T \pi a^2$$

Therefore,
$$N_r \sin\phi \cdot 2\pi x = p_T \pi (a^2 - x^2)$$

or $$N_r = \frac{p_T(a^2-x^2)}{2x \sin \phi} \quad (9)$$

To proceed further, we now need to know the geometry of the roof membrane, i.e., the relationship between $x$ and $\phi$.

Figure 8B:
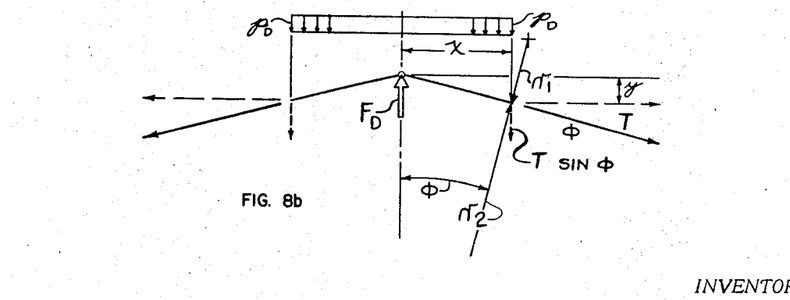

To determine this geometry, refer to FIG. 8b. When erected, the only load considered is the dead load. Now: let $n$=the number of erection cables; and T=the tensile force exerted in each cable at radius $x$.

For equilibrium of the vertical forces in FIG. 8b: let $F_D$=the vertical loading of center column under dead loading. Then $$F_D = p_D \pi x^2 + n T \sin\phi$$

For equilibrium of the vertical forces in the entire roof:

$$F_D = p_D \pi a^2$$

Therefore, $n T \sin\phi = p_D \pi (a^2 - x^2)$ or $$T = \frac{p_D \pi (a^2-x^2)}{n \sin \phi} \quad (10)$$

Figure 8C:
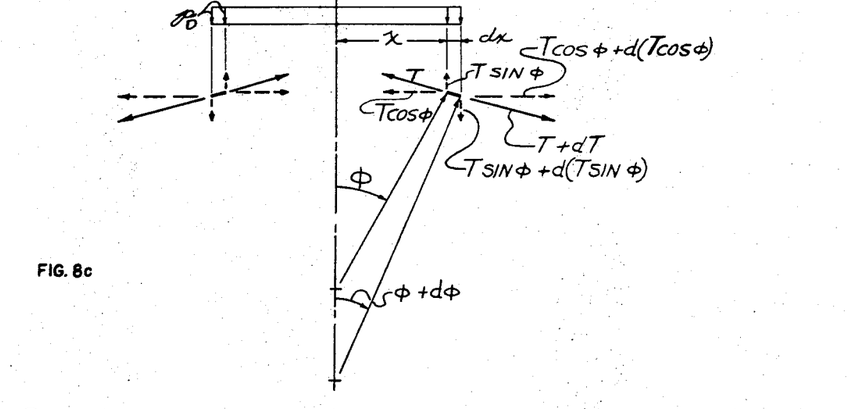

Now consider the elemental sections of the membrane shown in FIG. 8c.

For static equilibrium of the horizontal forces acting on the element:

$$n \cdot T \cos\phi = n \cdot T \cos\phi + n \cdot d(T \cos\phi)$$

Therefore, $d(T \cos\phi) = 0$ and $\quad T \cos\phi = \text{CONSTANT} = H \quad (11)$ For static equilibrium of the vertical forces:

$$n \cdot T \sin\phi = p_D \pi (x+dx)^2 - p_D \pi x^2 + n \cdot T \sin\phi + n \cdot d(T \sin\phi)$$

Cancelling, transposing, and simplifying the above equations may be written $$-p_D \pi (x^2 + 2x dx + dx^2 - x^2) = n \cdot d(T \sin\phi)$$

or $$\frac{d(T \sin \phi)}{dx} = \frac{2\pi p_D x}{n}$$

solving $$T \sin \phi = -\frac{\pi p_D x^2}{n} + C \text{ (a constant)}$$

and $$n \cdot T \sin\phi = -\pi p_D x^2 + C$$

At $$x=0, \ n \cdot T \sin\phi = F_D = p_D \pi a^2$$

Therefore, $$p_D \pi a^2 = K \text{ (a constant)}$$

and $$n \cdot T \sin\phi = -p_D \pi x^2 + p_D \pi a^2$$

or $$n \cdot T \sin\phi = \pi p_D (a^2 - x^2)$$

or $$T \sin \phi = \frac{\pi p_D (a^2-x^2)}{n} \quad (12)$$

Figure 8D:
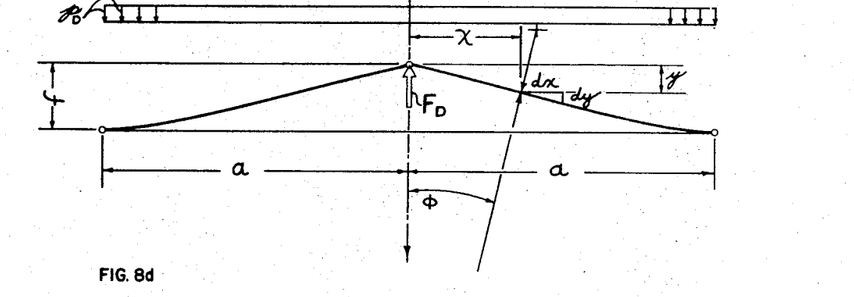

Now consider FIG. 8d:

$$\frac{dy}{dx} = \tan \phi = \frac{T \sin \phi}{T \cos \phi} = \frac{\pi p_D (a^2-x^2)}{nH}$$

solving $$y = \frac{\pi p_D}{nH}\left(a^2 x - \frac{x^3}{3}\right)$$

at $\quad x=a, \ y=f$ and $$f = \frac{\pi p_D}{nH}\left(a - \frac{a^3}{3}\right) = \frac{2\pi p_D a^3}{3nH}$$

or $$H = \frac{2\pi p_D a^3}{3nf} \quad (13)$$

the value of the horizontal component in each erection cable. Therefore, $$y = \frac{\pi p_D \left(a^2 x - \frac{x^3}{3}\right) 3nf}{n 2\pi p_D a^3}$$

$$y = f\left[\frac{3}{2}\left(\frac{x}{a}\right) - \frac{1}{2}\left(\frac{x}{a}\right)^3\right]$$

or $$\frac{y}{f} = \frac{3}{2}\left(\frac{x}{a}\right) - \frac{1}{2}\left(\frac{x}{a}\right)^3$$

or $$y = \frac{3}{2} f\left[\frac{x}{a} - \frac{1}{3}\left(\frac{x}{a}\right)^3\right] \quad (14)$$

which is the equation of the curve taken by the erection cables and the roof membrane upon erection and is the same as Equation 2.

Now to relate $x$ and $\phi$:

$$\tan \phi = \frac{\pi p_D (a^2 - x^2)}{nH} = \frac{\pi p_D (a^2 - x^2) 3nf}{n \cdot 2\pi p_D a^3}$$

Therefore, $$\tan \phi = \frac{3f}{2a}\left[1 - \left(\frac{x}{a}\right)^2\right] \quad (15)$$

Now to find $N_r$ for fixed values of $f$ and $a$, and a particular value of $x$,
(1) Find $\tan \phi$ from Equation 15.
(2) Find the value of $\phi$ and $\sin \phi$ from $\tan \phi$.
(3) And for a given $p_T$ find $N_r$ from Equation 9.

To find T for a fixed value of $f$ and $a$, and a particular value of $x$,
(1) Find $\tan \phi$ from Equation 15.
(2) Find H from Equation 13.
(3) Find the value of $\phi$ and $\cos \phi$ from $\tan \phi$.
(4) Find T from Equation 11.

Thus the geometry and shape of the roof membrane may be established for any given set of parameters.

Figure 8E:
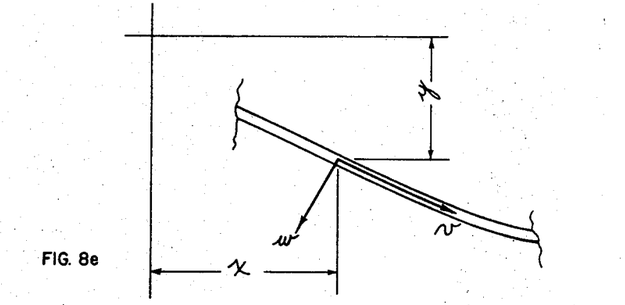

Having thus established the basic geometry of the roof membrane, it now becomes necessary to determine whether or not rain water will drain off of the roof under all anticipated loadings or will collect in a trough inwardly of the compression ring girder. If it is determined that a rain-collecting trough may develop, it then is necessary to slightly modify the geometry of the roof membrane to assure that no such trough or gutter can form. This modification, if necessary, requires an analysis of the displacement $v$ [tangent to the curve of the membrane at any point $(x,y)$] and $w$, the displacement [normal to the tangent] at the same point under consideration. Refer to FIG. 8e.

From basic relationships it can be shown that $$w = \mu r_2 \cdot \frac{N_r}{Eh} + v \frac{\cos \phi}{\sin \phi} \quad (16)$$

and $$v = \sin \phi \left[\int \frac{f_{(s)} dx}{\sin \phi \cos \phi} + C\right] \quad (17)$$

where $$f_{(s)} = \frac{N_r}{Eh}\left[1 + \mu \frac{r_2}{r_1}\right] \quad (18)$$

$$r_1 = \frac{1}{\cos^3 \phi} \cdot \frac{1}{\frac{d^2 y}{dx}} \quad r_2 = \frac{x}{\sin \phi} \quad (19)$$

and $$\frac{d^2 y}{dx^2} = -\frac{3fx}{a^2} \quad (20)$$

where $\mu$ = Poisson's Ratio and C = a constant of integration.

Equation 17 can be solved by a numerical integration procedure for any particular problem for a number of points on the roof, following which Equation 16 can be solved for these same points. From these numerical values of $v$ and $w$, the horizontal and vertical components of displacement of the chosen points can be calculated and the vertical components summed and added to the value of $y$ for the corresponding points to determine if these summed values for any point in the membrane are greater than $f$. If any of these summed values is greater than $f$, then the membrane may develop a trough inwardly of the compression ring and the geometry or strength of parts must be modified until the summed values are less than $f$. The herein-described exemplary roof construction will drain continuously even though it is under full anticipated live load.

In the procedure of modifying the geometry it becomes desirable to incrementally increase the value of $a$, e.g., the radius of the roof periphery, so $a$ becomes $a'$ and $a_2 = a + \Delta a_1 + \Delta a_2 + \ldots$ etc., until the requirement, $u_v + w_v + y \leq f$, is met. In increasing the value of $a$ incrementally, the imaginary point Q is established radially outwardly and downwardly of the point of attachment of the membrane to the compression ring and having the radial value $a'$, as explained. This imaginary point Q may be beyond the tank shell radius. However, the geometric curve of the membrane must pass through the point M of attachment to the compression ring. This is shown in FIG. 8f.

Figure 8F:
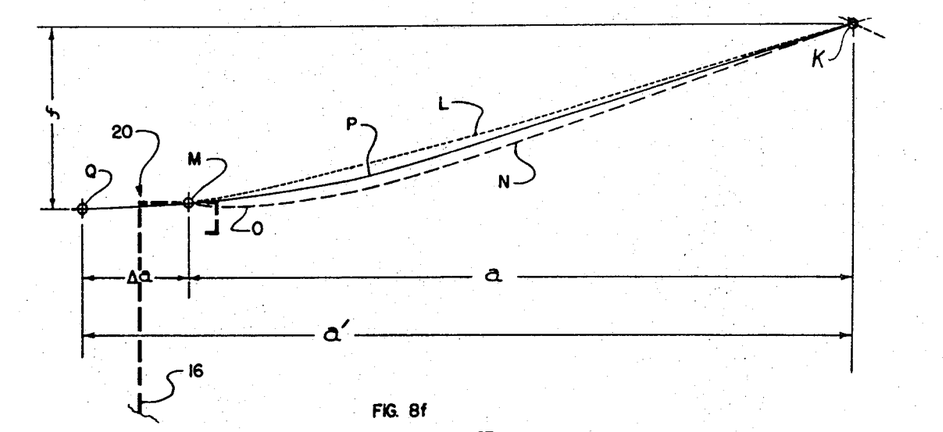

In FIG. 8f, the dotted line L shows the shape of the membrane as determined by Equation 2 with dead load only. The dashed line N shows the shape the membrane may take when loaded with live plus dead load. Note that the point O may be below the point of attachment to the compression ring M, resulting in a liquid-trapping trough.

Now by increasing the value of $a$ to $a + \Delta a$ and computing the geometry of the roof membrane under total loading conditions, we can develop a geometric shape such as is indicated by solid line P which passes through the point of attachment M to the compression ring and in which no point on the curve is below the point M even with maximum total loading. In other words, all portions of the roof membrane will at all times slope radially and outwardly, as desired.

The manual solution for the values $v$ and $w$, using numerical integration or integration by approximation as by use of the trapezoidal rule or Simpson's rule, becomes a very laborious operation and will consume many hours. When it is considered that this must be done for each trial solution and if the solution is not satisfactory, additional trial calculations must be undertaken, increasing the value of $a$ by differential values $\Delta a$ until a solution is obtained in which the membrane under total load does not sag below the level of its periphery M, and it is realized that the proper solution of the problem by manual means becomes impractical.

However, the above-developed equations mathematically defining the novel roof construction are such as to be solvable by modern computer techniques for various sets of parameters. This possibility makes the novel roof practical, from engineering as well as economic considerations, particularly in the cases of the very large tanks frequently used for storing volatile liquids, such as petroleum and its products.

In the erection of a roof of this type it is necessary that the cables, bars, or rods 22 be fabricated so that they are alike and of the proper lengths to shape as desired the roof sheet or membrane formed by the gore plates which are laid thereon and welded together. The lengths of the erection rods 22 are also calculated on an electronic computer to assure the desired ultimate shaping of the roof.

Figure 9:
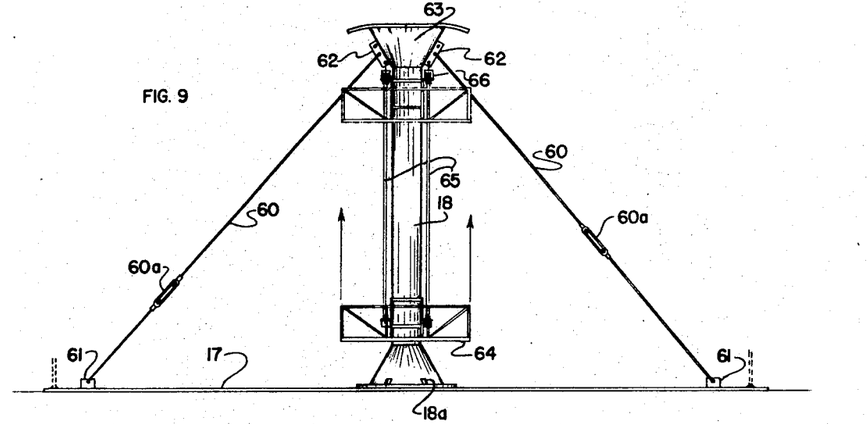
FIG. 9 is an elevation of the center column and supporting guys and illustrating a first step in an exemplary method of erecting the roof.
Figure 10:
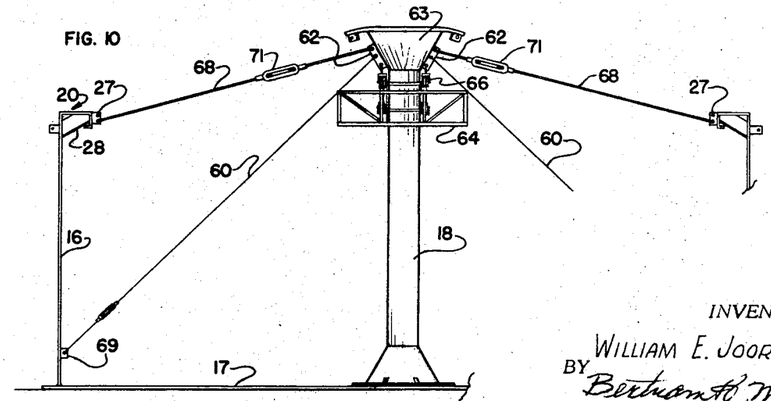
FIGS. 10, 11, 12, and 13 are views similar to FIG. 9 and illustrating further steps in the erection of the roof.

FIGS. 9–13 illustrate the sequential operations in a novel method of erecting the roof. In FIG. 9, the center column 18 is centrally mounted on floor plate 17 and guyed in the upright position by means of cables 60 with turnbuckle tightners 60a and extending between lugs 61 projecting from the floor plates and the central holes in lugs 62 on force-dispersing inverted cone 63. A workman's cage 64 is then supported adjacent or about column 18 upon cables 65 carried by blocks 66 suspended from the bottom holes of lugs 62. A drain port is symbolized at 18a. Then, as shown in FIG. 10, carriage 64 is elevated by means of tackle 65, 66 to permit workmen to attach ring girder truing rods 68 which are equally spaced about column 18 to the upper holes of lugs 62 and then attach the other ends of these rods to the bottom holes of apertured clevis lugs 27 on compression girder 20. Turnbuckles 71 provide for adjusting the lengths of rods 68. When this is accomplished and the compression girder 20 is surveyed and found to be round, the joints between the adjacent sections of the compression girder must be welded. The roundness of the girder should again be surveyed and corrected if necessary. FIG. 10 also shows tank shell 16 erected and guys 60 moved to lugs 69 near the base of wall 16.

Figure 11:
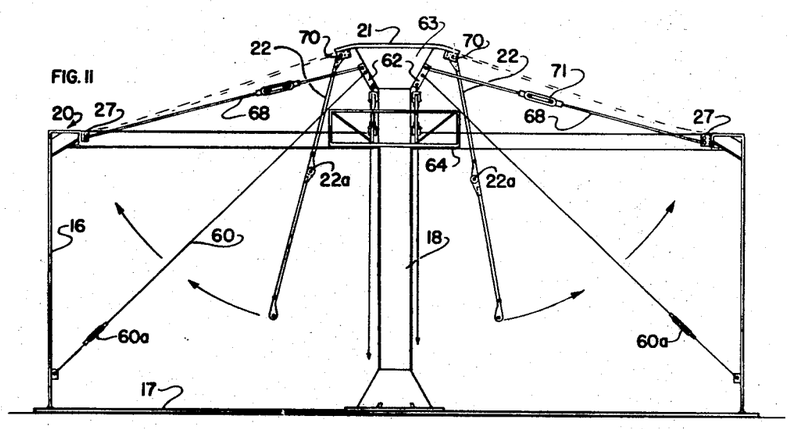
Figure 12:
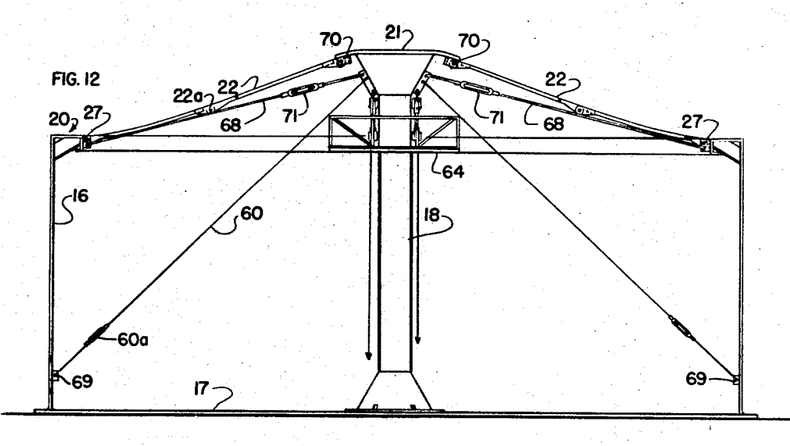
Figure 13:
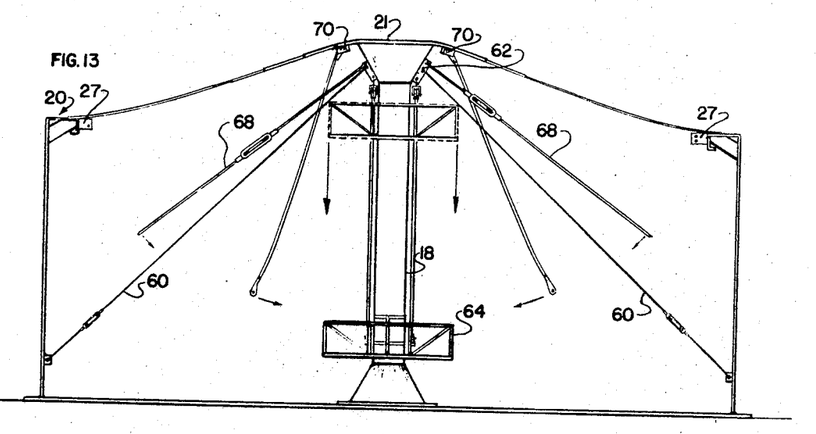

Next (as shown in FIGS. 11 and 12) the roof erection rods 22, formed of two more parts hinged as at 22a, are pivotally attached to lugs 70 at the periphery of roof crown sheet 21 and then elevated toward lugs 27 of the now accurately circular compression ring. All of erection rods 22 are constructed of sufficient length to bridge the pairs of lugs 70 and 27 so as to parallel the surface of revolution ultimately to be assumed by the superposed roof plates. After erection rods 22 are pinned to the upper holes in compression ring lugs 27, as explained, roof sheet plates 29, 30, 31, 32, and 33 are applied upon the rods and securely welded to each other and to crown plate 21 and the compression girder. Ring truing rods 68 are then disconnected first from lugs 27, then dropped, as shown in FIG. 13, and disconnected from crown plate lugs 70.

After the completion of the roof in this manner, erection rods 68 may be disconnected first from lugs 27, then lowered, and disconnected from upper end lugs 70. Finally, guying cables 60 may be released and carriage 64 lowered and removed. The roof structure is now complete, as shown in FIGS. 2 and 2A, with all roof loads carried by the roof membrane between the center column and ring girder.

Figure 14:
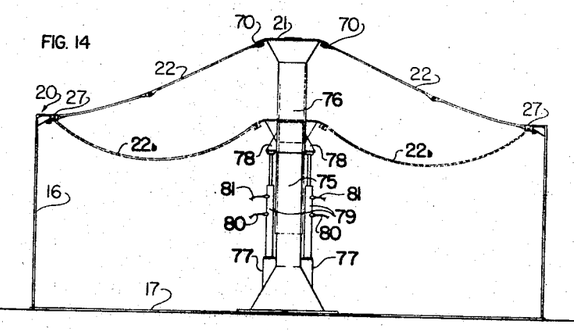
FIG. 14 is an elevation of the center column, tank shell, tank bottom, and erection cables illustrating a modified, preferred method of erecting the roof.

Although we have described one novel erection method, the preferred novel erection method will now be described and is illustrated in FIG. 14. In this figure it will be noted that the center column is fabricated in two parts 75 and 76 so that the lower part will telescope within the upper part. Both parts are provided with lugs 77 and 78 designed to mount hydraulic jacks 79 between the lugs so that after the two telescoped parts are erected in the center of the tank, the jacks may be inserted between the lugs. Hydraulic connections 80 and 81 provide for actuating the hydraulic jacks so that the upper column part may be jacked upward to a position a few inches above its normal designed height.

While column part 76 is in its convenient, lower, dot-dash position of FIG. 14, the erection cables or bars 22 (having been fabricated to their exact required lengths) are bolted to the lugs 70 on the underside of the flange of the crown plate and to clevices 27 on the compression ring. This operation is performed prior to welding the radial joints in the compression ring but after the compression ring has been welded to the upper edge of the tank shell. At this stage, the erection cables or bars will sag in a loose curve as is shown at 22b in FIG. 14, since the crown plate is about the same elevation as the compression ring.

At this stage in the erection operation, the upper section 76 of the center column is jacked upward to an elevation of a few inches above its final erected position (FIG. 14, solid lines). Now, since the erection bars are of accurately calculated lengths, the erection bars will be pulled taut, coincidentally, rounding up the compression ring and applying the same tensile force to all erection bars so that they will all have only slight but uniform sag.

Now the roundness of the compression ring should be checked and then the radial joints at the adjacent ends of the segmental sections of the compression ring girder are welded. When this is done, the compression ring will remain circular when the upper section of the center column is lowered a few inches to its designed height and the erection cables or rods 22 will all have the same sag required to give the membrane roof plates to their required geometrical shape.

The center frusto conical plates 29 are first applied in position on the rods around the crown plate 21 and butt welded or in some cases lap welded to the crown plate and to each other. Then the remainder of the membrane plates are moved into place on the erection bars, adjusted to the proper position, and butt or lap welded together in a developed welding sequence which will minimize plate warpage due to welding. In this manner a smooth shaped roof membrane fitting the design geometry of the roof may be erected.

However, if a survey of the erected roof membrane plates indicates that a trough in the membrane may be formed inside the compression ring which will accumulate rain water, the jacks may be used to increase the height of the center column a few inches, stretching the roof membrane to eliminate the possibility of a trough forming.

At this period in the erection procedure, the upper section of the center column is welded inside and outside to the lower section, making it an integral column. Access to the inside is usually provided by a manhole in the crown plate.

Finally, the erection rods and the jacks may be removed and the fabrication work on an internal floating roof or other uncompleted work finished.

This erection procedure may be used to secure the required geometrical shape of the roof with a minmum of erection labor. The described design and methods may be used for constructing tanks having a diameter in excess of two hundred feet. The heavy, long, radial girders and numerous columns, joints, and rafters heretofore frequently utilized to support large, fixed roofs are, as stated, eliminated by the present construction. If an internal floating roof is to be installed, for instance, in a conventional cone roof tank of large size, there will usually be many columns passing through the floating roof which require vapor seals at each column. This type of tank construction is much more difficult to build than is the herein-described tank and considerably more expensive, the saving in cost per tank with the use of the present invention amounting to several thousand dollars, or more. One specific source of saving results from the location of compression ring girder structure 20 on the inner surface of the tank wall. Since the ring girder must have substantial width in order to resist the radial forces to which it is subjected by the roof, such width is advantageously used to reduce the expanse and therefore the cost of the roof structure.

The invention may be modified in various respects, as will occur to those skilled in the art. For instance, the elevation of the top part of the center post or column in order to shape and tension the tension cords 22 and the roof may be effected in other ways.

I claim:

1. A roof for a large cylindrical tank comprising an annular compression member for mounting on the tank wall, center post structure projecting substantially above the level of said member, and flexible roof material centrally supported from said post structure and curving continuously downwardly and outwardly to the roof periphery for shedding fluent material over the edge of the roof, all portions of said roof, including portions adjacent the periphery thereof, being of sufficient radial tensional strength to remain under continuously downwardly and outwardly sloping configuration even when subjected to maximum anticipated dead and live loading, at least the top portion of said center post structure being vertically movable for positioning and tensioning said roof material.

References Cited

UNITED STATES PATENTS

| | | | |
|---|---|---|---|
| 1,611,440 | 12/1926 | Haupt | 220—26 |
| 1,698,158 | 1/1929 | Glass. | |
| 1,990,838 | 2/1935 | Nemec. | |
| 2,004,113 | 6/1935 | Horton. | |
| 2,307,508 | 1/1943 | Jayne. | |
| 2,960,252 | 11/1960 | Ulm. | |
| 3,001,273 | 9/1961 | Wiggins. | |
| 3,185,335 | 5/1965 | Lecler. | |
| 3,343,708 | 9/1967 | Haas. | |

FOREIGN PATENTS

| | | |
|---|---|---|
| 1,196,283 | 5/1959 | France. |
| 75,470 | 10/1932 | Sweden. |

GEORGE E. LOWRANCE, Primary Examiner

J. R. GARRETT, Assistant Examiner

U.S. Cl. X.R.

220—1, 26